March 16, 1937.  H. PETERS  2,074,271

METHOD AND APPARATUS FOR THE PRODUCTION OF SEAMLESS TUBING

Filed Dec. 23, 1932

INVENTOR
Herbert Peters

Patented Mar. 16, 1937

2,074,271

UNITED STATES PATENT OFFICE 2,074,271

METHOD AND APPARATUS FOR THE PRODUCTION OF SEAMLESS TUBING

Herbert Peters, Aachen, Germany

Application December 23, 1932, Serial No. 648,714
In Germany March 19, 1932

13 Claims. (Cl. 205—4)

My invention relates to a tube push bench for the production of seamless tubes and other tubular articles, particularly of iron and steel, and its object is to provide the push bench with means, which are to expand the tube having been stretched out to the desired size, and to loosen its hold upon the mandrel immediately after its passage through the last stretching elements and through one and the same operative movement.

The production of tubes by means of the push bench is carried out thus that a cup-shaped shell is put on a mandrel and then, together with the latter, is pushed through a series of stretching elements in the shape of die-rings which also—wholly or partly—may be substituted by rollers. In this way the shell is being reduced in wall thickness and stretched out into a hollow body of longer length. This hollow body, after its passage through the die-rings or rollers, sticks firmly upon the mandrel and has to be released from same. For hollow bodies of a length up to about 13 feet this can be done without difficulty, if during the return movement of the rack of the push bench, by means of which the hollow body has been pushed through the die-rings, the hollow body is held fast by a suitable device, whereupon the rack or other means employed for the forward movement of the mandrel bar withdraws the latter from the tube. However, in this instance there is the disadvantage that a large piece of the hollow body, at that point where it is held fast, becomes deformed very much; wrinkles are formed which shift against each other, so that this portion of the tube has to be cut off and scrapped as waste. For hollow bodies of longer length, produced by the push bench, such a withdrawing of the mandrel by means of the rack returning to its initial working position is not possible any more on account of the great friction between the hollow body and the mandrel and it, therefore, is necessary to expand the hollow body to such an extent by suitable mechanical means in a separate working process, that the mandrel can easily be removed out of the hollow body. For this purpose expensive rolling mills, such as releasing mills and the like, are employed which require much consumption of power.

The invention, by way of example, is explained by the attached drawing, in which Fig. 1 is a scheme of a tube push bench provided with rollers, i. e. the end portion of the push bench, Fig. 2 is a cross section through those parts of the pair of rollers before the last one, working against each other and enclosing an oval-shaped tube confining passage or groove, and through the hollow body stretched out along the mandrel, Fig. 3 is a cross section through parts of the last pair of rollers enclosing a circular-shaped tube confining passage or groove, the mandrel and the hollow body, Fig. 4 is an axial section through a hollow mandrel with cooling pipe.

Figure 1:
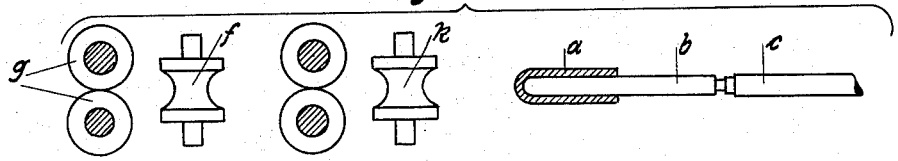
Figure 5:
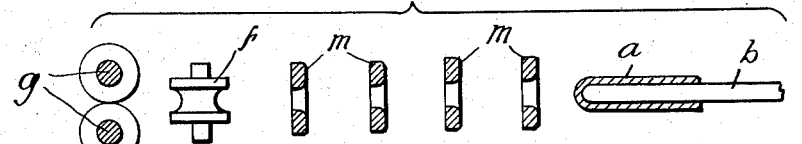
Fig. 5 is a similar view to Fig. 1 but illustrates die rings instead of rollers for elongating the blank.

The cup-shaped shell $a$ produced in the usual known manner is put on the mandrel $b$ of the push bench and by that pushed through pairs of rollers $k$, Fig. 1, of the push bench by means of the mandrel shaft or carrier $c$ and the rack or any other means not shown, until the hollow body to be produced has been elongated to the desired extent. In the drawing for the sake of simplicity only two pairs of rollers $k$ are shown for elongating the blank or shell $a$, but it will of course be well understood by those skilled in the art that more than two pairs of rollers may be used for this purpose, and also that die rings may be used in place of rollers for elongating the blank. As shown in Fig. 5, a plurality of die rings $m$ of gradually decreasing internal diameters may be employed for elongating the blank or shell $a$. After having passed through the last pair of rollers $k$ or the last of the die-rings $m$, the hollow body $a$ passes through the pair of rollers $f$ having an oval-shaped calibration or groove. It is so dimensioned that its narrowest portion exercises a pressure upon the hollow body, thus reducing its wall thickness slightly at these pressed points. In consequence, an elongation of the pressed portions takes place in cross-direction of the hollow body, in accordance with which that portion of the cross-section, which is not under pressure, is loosened from the mandrel $b$ and clearances $h$ are formed, in the direction of the larger diameter of the tube confining passage or groove, between the mandrel and the inside wall of the hollow body.

Figure 2:
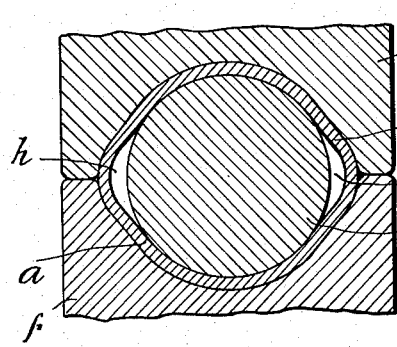
Figure 3:
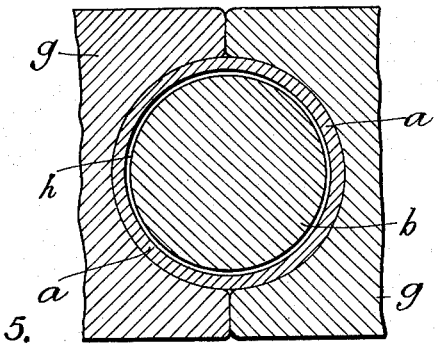

During the continued pushing of the hollow body in forward direction it enters into the circular-shaped tube confining passage or groove of the rollers $g$. On passing them the clearance $h$ shown on both sides in Fig. 2 is equally extended around the mandrel $b$, that means, the hollow body $a$ is being loosened completely from the mandrel. After having fully completed its passage through the push bench the mandrel $b$, therefore, will lie loosely, or loosened with very little pressure within the groove before the last one, within the hollow body. For withdrawing the mandrel from the hollow body no power worth mentioning will be required. In any case, this power will be so insignificant that the shape of the hollow body will not be injured during the withdrawal of the mandrel.

Instead of the pairs of rollers shown, the loosening of the hollow body also can be done by sets of rollers, comprising 3 or more rollers arranged opposite each other. If during the passage of the hollow body through the oval-shaped tube confining passage or groove an undue reduction of the wall thickness should take place at those points of the tube in touch with the mandrel, as compared to the other points of the tube, then a second likewise oval-shaped tube confining passage, displaced for 90°, can be arranged behind the first one, which reduces the other points of the tube to the same smaller wall thickness. After that the tube proceeds to the last, the circular-shaped tube confining passage or groove.

Figure 6:
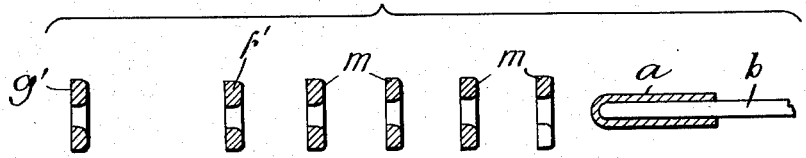
Fig. 6 is a similar view to Fig. 5 but illustrates die rings instead of rollers for loosening the blank from the mandrel.

Instead of the rollers $f$, $g$, die rings $f'$, $g'$, shown in Fig. 6 may be employed for loosening the hollow body from the mandrel $b$, such die rings having tube confining passages according to the present invention.

Instead of giving the loosening-tube confining passage or groove, preceding the end-tube confining passage or groove an oval shape, the grooves also can enclose a square or other suitable shape, if only the condition is fulfilled that by the tube confining passage the tube is transformed thus that clearances are formed around the mandrel which, owing to their being extended around the whole cross-section of the mandrel within the subsequent tube confining passage, cause that the tube is completely made loose upon the mandrel, respectively loosens itself from the same.

Instead of a single die-ring or pair of rollers $f$, several die-rings or sets of rollers can be employed as well, thus that the partial loosening of the tube from the mandrel as required for the end-tube confining passage is not done within a single tube confining passage, but by several of them.

The invention offers a number of advantages, as compared to the methods employed hitherto. If the mandrel is being withdrawn by means of the rack, then this can now be done regardless of the length of the hollow body. In addition, a disadvantage experienced hitherto is avoided, namely that the hollow body is deformed near the holding-fast device as required previously and thereby spoiled to some extent, since in accordance with the invention the mandrel, after leaving the push bench, lies loosely within the hollow body. If, however, the mandrel proceeds in the same way as it had to take formerly after leaving the releasing mill or the like, then the advantage of the invention is, that the releasing mill is being eliminated, as now the releasing is done within the push bench itself, whereby the way of operation is shortened considerably and the whole push bench takes up less space. Besides, the plant is much cheaper on account of the elimination of the special devices required for loosening the hollow body. In consequence of the shorter way of operation, naturally, a saving of time and by that in increase in output is effected in both instances. Furthermore, as the hollow body, which mostly is stretched out in red-hot state, will lose only little of its heat, since the push bench process requires a few seconds only, it will be possible to subject the hollow body to subsequent treatments still in the same heat or at least by utilizing its heat largely, after being loosened from the mandrel, for example to reduce it to a smaller diameter in a reducing mill, or to enlarge to a larger diameter in an expanding mill or, if it is the question of producing high-grade tubes, to pass it through a polishing mill over a stopper or the like.

Figure 4:
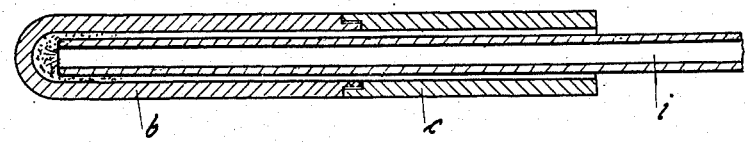

If the mandrel, as explained above, is withdrawn from the tube by the returning rack, it will at once be ready for the next working cycle. As now, according to the invention, a quick succession of the working cycles is made possible, naturally, a considerable heating of the mandrel, if used without exchanging, will take place, which will be the greater the longer the tubes to be produced are. It, therefore, would be necessary to exchange the mandrel, having become undue hot already after producing a few tubes, which in any case would cause delay. In order to avoid such loss of time and by that to utilize as far as possible the advantages offered by the invention described, it is advisable to cool the mandrel by water or air from the inside and during the working process, as shown by way of example in the attached Fig. 4. The mandrel $b$ as well as the mandrel shaft $c$ screwed on to same are hollow. A pipe $i$ is introduced into both, the outside diameter of which is smaller than the clear diameter of the mandrel and the mandrel shaft. The pipe $i$ is open at its front end and it reaches up to nearly the front end of the mandrel. If cold water or cooled air or the like is led into the pipe $i$, these cooling means stream from the open pipe towards the head of the mandrel and back again through the inside of the mandrel and the mandrel shaft. In this way both the mandrel and mandrel shaft are being cooled continuously, so that it will be possible to stretch out several 1000 of hollow bodies into tubes along a single mandrel, without an interruption in service, as caused by the necessity of having to exchange the mandrel having become hot, taking place. Thereby the efficiency of the tube push bench is increased considerably, besides the life of the mandrel is increased and the product improved, as the cooled mandrel maintains its smooth working surface much longer than a non-cooled mandrel. It is advisable and cheap to make the mandrel from seamless tubes and from alloyed steel. The inside cooling of the mandrel also can be done in another way than described and shown in drawing.

What I claim is:—

1. In a method of producing seamless tubes by the push bench process, the steps for loosening the tube from the mandrel of imparting a substantially oval section to the elongated tube during its passage through a tube confining passage bearing all around said tube, and converting such oval section without substantial pressure on the mandrel into the desired circular cross section by passage of the tube through a circular tube confining passage.

2. In a method of producing seamless tubes by the push bench process, the steps for loosening the tube from the mandrel of imparting a substantially oval section to the elongated tube during its passage through a tube confining passage bearing all around said tube, and converting such oval section without substantial pressure on the mandrel into the desired circular cross section by passage of the tube through a circular tube confining passage having the same circumferential dimension as the first mentioned tube confining passage.

3. In a method of producing seamless tubes by the push bench process, the steps for loosening the tube from the mandrel of imparting a substantially oval section to the elongated tube during its passage through a tube confining passage bearing all around said tube, converting such oval section without substantial pressure on the mandrel into the desired circular cross section by passage of the tube through a circular tube confining passage, and internally cooling the mandrel.

4. In a method of producing seamless tubes by the push bench process, the steps for loosening the tube from the mandrel of imparting a substantially oval section to the elongated tube during its passage through a tube confining passage bearing all around said tube, converting such oval section without substantial pressure on the mandrel into the desired circular cross section by passage of the tube through a circular tube confining passage having the same circumferential dimension as the first mentioned tube confining passage, and internally cooling the mandrel.

5. The method of producing seamless tubes comprising placing a tubular blank on a mandrel, elongating said blank by forcing it through drawing devices, imparting a substantially oval section to the elongated tube during its passage through a tube confining passage bearing all around said tube, and converting such oval cross section without substantial pressure on the mandrel into the desired cross section without substantial pressure on the mandrel into the desired cross section during its passage through a tube confining passage whereby the tube is completely loosened from the mandrel.

6. In a method of producing seamless tubes by the push bench drawing process involving passing a tube blank on a mandrel through pairs of rolls to elongate said blank, the steps for loosening the elongated tube from the mandrel of imparting a substantially oval shape to the elongated tube during its passage through the tube confining passage formed by the last pair but one of said rolls, and converting, without pressing the tube on said mandrel, said oval shape into the desired cross section by passage of said tube through a circular tube confining passage formed in the last pair of said rolls.

7. Push bench apparatus for the production of seamless tubing comprising a pushing mandrel for receiving a tubular blank or billet, and pairs of drawing rolls for successively acting on said blank, the last but one pair of said rolls having a closed substantially oval tube confining passage formed therebetween for bearing all around and imparting a substantially oval cross section to an elongated tube passed therethrough, while the last pair of said rolls has a closed substantially circular tube confining passage formed therebetween for converting said oval shape into a circular cross section by bearing all around the tube without pressing same upon the mandrel.

8. Push bench apparatus for the production of seamless tubing comprising a pushing mandrel for receiving a tubular blank or billet, pairs of drawing rolls for successively acting on said blank, the last but one pair of said rolls having a closed substantially oval tube confining passage formed therebetween for bearing all around and imparting a substantially oval cross section to an elongated tube passed therethrough, while the last pair of said rolls has a closed substantially circular tube confining passage formed therebetween of the same circumferential dimension as the first mentioned passage for converting said oval shape into a circular cross section by bearing all around the tube without pressing same upon the mandrel.

9. Apparatus for the production of seamless tubing comprising a hollow pushing mandrel for receiving a tubular blank or billet, pairs of drawing rolls for successively acting on said blank, the last but one pair of said rolls having a closed substantially oval tube confining passage for bearing all around and imparting a substantially oval cross section to an elongated tube passed therethrough, while the last pair of said rolls has a closed substantially circular tube confining passage formed therebetween for converting said oval shape into a circular cross section by bearing all around the tube without pressing same upon the mandrel, and means for supplying cooling medium to within said hollow mandrel.

10. Apparatus for the production of seamless tubing comprising a hollow pushing mandrel for receiving a tubular blank or billet, pairs of drawing rolls for successively acting on said blank, the last but one pair of said rolls having a closed substantially oval tube confining passage formed therebetween for bearing all around and imparting a substantially oval cross section to an elongated tube passed therethrough, while the last pair of said rolls has a closed substantially circular tube confining passage formed therebetween of the same circumferential dimension as the first mentioned passage for converting said oval shape into a circular cross section by bearing all around the tube without pressing same upon the mandrel, and means for supplying cooling medium to within said hollow mandrel.

11. Apparatus for the production of seamless tubing comprising a hollow pushing mandrel for receiving a tubular blank or billet, pairs of drawing rolls for successively acting on said blank, the last but one pair of said rolls having a closed substantially oval tube confining passage formed therebetween for bearing all around and imparting a substantially oval cross section to an elongated tube passed therethrough, while the last pair of said rolls has a closed substantially circular tube confining passage formed therebetween of the same circumferential dimension as the first mentioned passage for converting said oval shape into a circular cross section by bearing all around the tube without pressing same upon the mandrel, and means for continuously supplying cooling medium to within said hollow mandrel.

12. Apparatus for the production of seamless tubing comprising a hollow pushing mandrel for receiving a tubular blank or billet, pairs of drawing rolls for successively acting on said blank, the last but one of said rolls having a closed substantially oval tube confining passage formed therebetween for imparting a substantially oval cross section to an elongated tube passed therethrough, while the last pair of said rolls has a closed substantially circular tube confining passage formed therebetween for converting said oval shape into a circular cross section by bearing all around the tube without pressing same upon the mandrel, and means for continuously supplying cooling medium to within said hollow mandrel.

13. In combination with push bench apparatus for the production of seamless tubes having a hollow pushing mandrel for receiving a tubular blank or billet, and means for acting on said blank to elongate same, means for loosening the elongated blank from the mandrel at the conclusion of a drawing operation comprising a closed substantially oval-shaped tube confining passage for bearing all around and imparting a substantially oval cross section to a tube passed therethrough and a closed circular tube confining passage for converting such oval cross section into the desired circular cross section by bearing all around the tube without pressing same upon the mandrel, and means for supplying cooling medium to within said hollow mandrel.

HERBERT PETERS.